United States Patent
Narui (10) Patent No.: US 6,278,433 B2
(45) Date of Patent: *Aug. 21, 2001

(54) METHOD AND APPARATUS FOR SETTING UP A MONITOR

(75) Inventor: Yoshihisa Narui, San Diego, CA (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,251

(22) Filed: Jul. 31, 1998

(51) Int. Cl.[7] .............................. G09G 5/00; G06F 13/00; H04N 17/02

(52) U.S. Cl. .................... 345/112; 345/326; 348/177

(58) Field of Search .................... 345/112, 156, 345/184, 150, 147, 326–327, 333, 334, 342, 352, 347; 348/176–179, 184–185, 333.11, 333.12; 717/11

(56) References Cited

U.S. PATENT DOCUMENTS

| 5,237,417 | * | 8/1993 | Hayashi et al. ............... 348/569 |
| 5,483,260 | * | 1/1996 | Parks et al. ................... 345/156 |
| 5,739,809 | * | 4/1998 | McLaughlin et al. ......... 345/150 |
| 6,059,842 | * | 5/2000 | Dumarot et al. ............... 717/11 |

* cited by examiner

Primary Examiner—William A. Cuchlinski, Jr.
Assistant Examiner—Thu Nguyen
(74) Attorney, Agent, or Firm—Crosby, Heafey, Roach & May PC (57) ABSTRACT

Conventional method sets up parameters for a monitor by using the panel buttons installed in the front of the monitor, especially when the monitor is first connected to a computer. However, it is inconvenient to use the panel buttons to set up a monitor. To overcome the shortcomings of the available art, a monitor set up application displays a visual interface for setting up a monitor. The visual interface provides a pattern background and an adjustment window. Monitor adjustments can be performed through the adjustment window. The pattern background changes in response to each step of the adjustment, so that a user can observe the impacts of the adjustment. In addition, based on the model of the monitor, the visual interface provides the message indicating the recommended adjustments to the monitor.

22 Claims, 8 Drawing Sheets

METHOD AND APPARATUS FOR SETTING UP A MONITOR

BACKGROUND OF THE INVENTION

1. Field of the Invention

This invention relates generally to a method and apparatus for setting up monitors.

2. Related Art

Display monitors are commonly used to display inputs to, and outputs from, computers to which the monitors are connected. To obtain optimal display effects, a monitor has to be set up with appropriate parameters, including resolution, scanning frequency, brightness, contrast, center position, tilt position, etc. The conventional method adjusts monitor parameters, especially when a monitor is connected to a computer for the first time, by using the panel buttons installed in the front of the monitor. However, it is not convenient to use the panel buttons to adjust the monitor parameters. Specifically, monitor panel buttons are usually unable to provide instructions as how to set up a particular monitor parameter. A user may need to frequently consult a monitor menu in adjusting a monitor parameter. In addition, in an adjustment process of a monitor, the conventional method does not provide a user with recommended adjustments for the monitor and the adjustment impact upon the monitor in each step of the adjustment process. Furthermore, the panel buttons of the available monitors may not be able to adjust some of the monitor parameters. For example, the panel buttons of the available monitors are not able to adjust display resolution.

There is, therefore, a need for an improved method and apparatus to adjust monitor parameters.

There is another need for an improved method and apparatus to provide a user with recommended adjustments in the adjusting process to the monitor.

There is yet another need for an improved method and apparatus to provide a user with visual information to indicate the impact in each step of the adjusting process to the monitor.

The present invention provides a method and an apparatus to meet these needs.

SUMMARY OF THE INVENTION

To address the shortcomings of the available art, the present invention provides a novel method for adjusting a monitor having a screen. The method comprises the steps of: displaying, on the screen, a pattern background for indicating current displaying quality of the screen; displaying, on the pattern background, an adjustment window; and performing adjustment to the monitor through the adjustment window.

The present invention also provides an apparatus for performing the method described above.

The foregoing and other features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS

Figure 1:
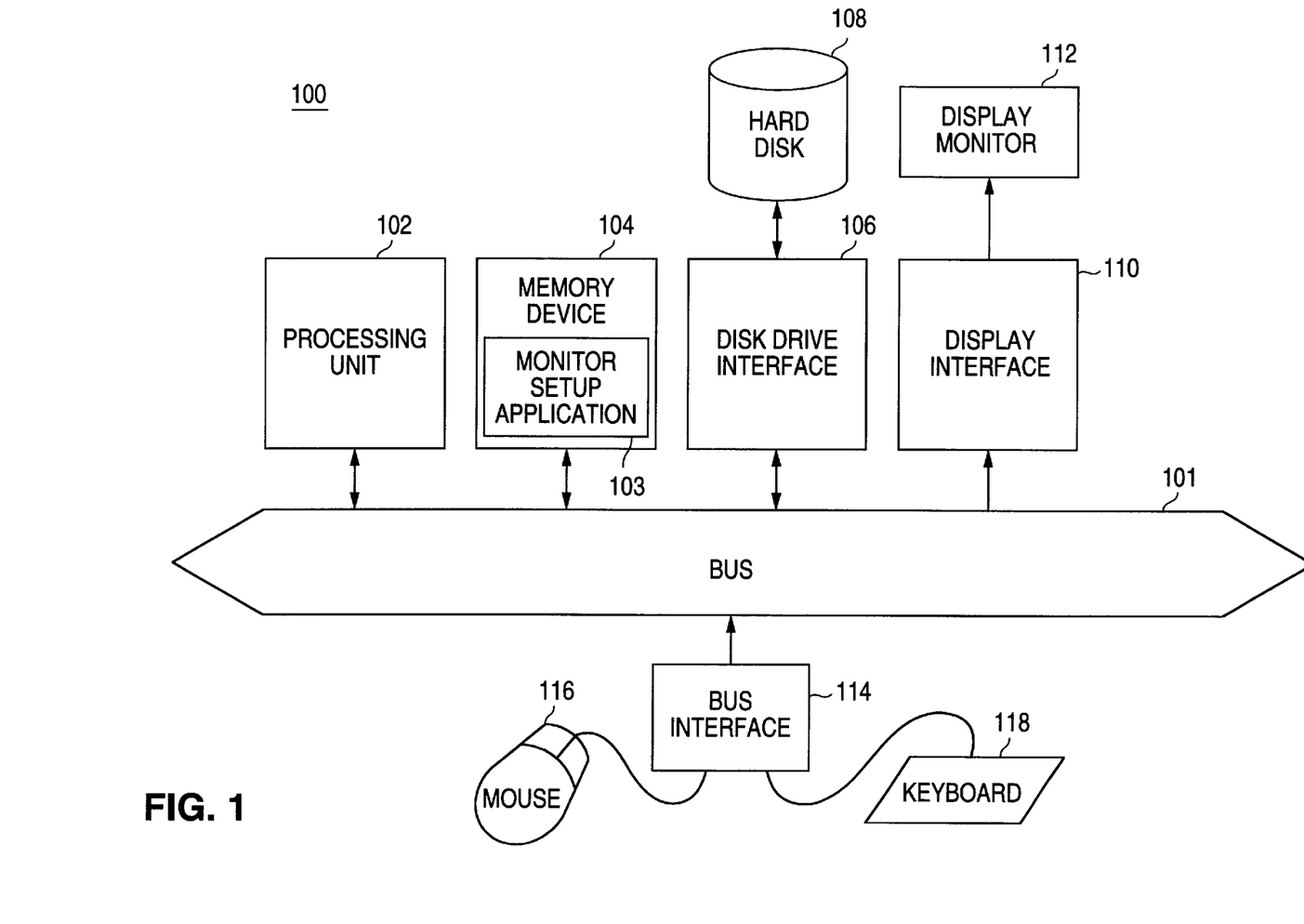
FIG. 1 shows a block diagram of an exemplary computer system having a monitor, which can be used as a hardware platform to implement the present invention.

Referring to FIG. 1, there is shown a block diagram of an exemplary computer system 100, which can be used as a hardware platform to implement the present invention.

As shown in FIG. 1, the computer system 100 includes a system bus 101, a processing unit 102, a memory device 104, a disk drive interface 106, a hard disk 108, a display interface 110, a display monitor 112, a serial bus interface 114, a mouse 116, and a keyboard 118.

The hard disk 108 is coupled to the disk drive interface 106; the monitor 112 is coupled to the display interface 610, and the mouse 116 and keyboard 118 are coupled to the serial bus interface 114. Coupled to the system bus 101 are the processing unit 102, the memory device 104, the disk drive interface 106, and the display interface 110.

Memory device 104 stores data and programs. Specifically, the memory device 104 stores a monitor set up application 103 for setting up the monitor 112. Operating together with the disk drive interface 106, the hard disk 108 also stores data and programs. However, memory device 104 has faster access speed than hard disk 108, while the hard disk 108 has higher capacity than memory device 104. The hard disk 108 contains a monitor identification (monitor ID) file. After a monitor has been set up, the monitor ID list file stored the monitor ID associated with the monitor.

Operating together with the display interface 110, the monitor 112 provides visual interfaces between the programs being executed and users, and displays the outputs generated by the programs.

Operating together with the serial bus interface 114, the mouse 116 and keyboard 118 provide inputs to the computer system 100.

The processing unit 102 controls the operations of the computer system 100 by executing the programs stored in the memory device 104 and hard disk 108. The processing unit 102 also controls the transmissions of data and programs between the memory device 104 and the hard disk 108.

Figure 2:
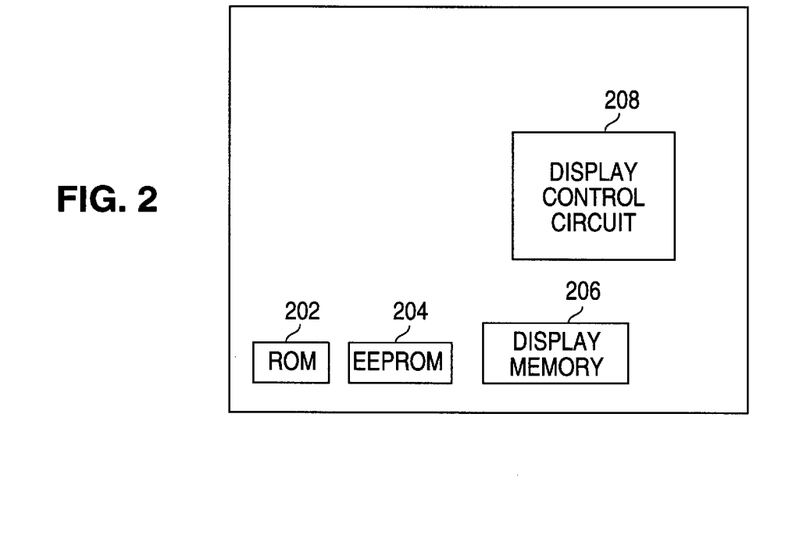
FIG. 2 shows some circuits within the monitor of FIG. 1.

Referring to FIG. 2, there are shown some circuits within the monitor 112 shown in FIG. 1. As shown in FIG. 2, the monitor 112 includes a ROM (read-only memory) 202, an EEPROM (electronically erasable programmable read-only memory) 204, a display memory 206, and a display control circuit 208.

The ROM 202 stores the information about the monitor 112, such as monitor ID, model, and name of the manufacture. The EEPROM 204 stores display parameters, such as resolution, scanning frequency, contrast, display size, center position, and title position. The display memory 206 stores the contents that are received from the display interface 110 and to be displayed on the monitor 112. The display control circuit 208 reads the contents from the display memory 206, and generates vertical and horizontal scanning signals to display the contents on the screen of the monitor 112, in accordance with the parameters stored in EEPROM 204.

Figure 3:
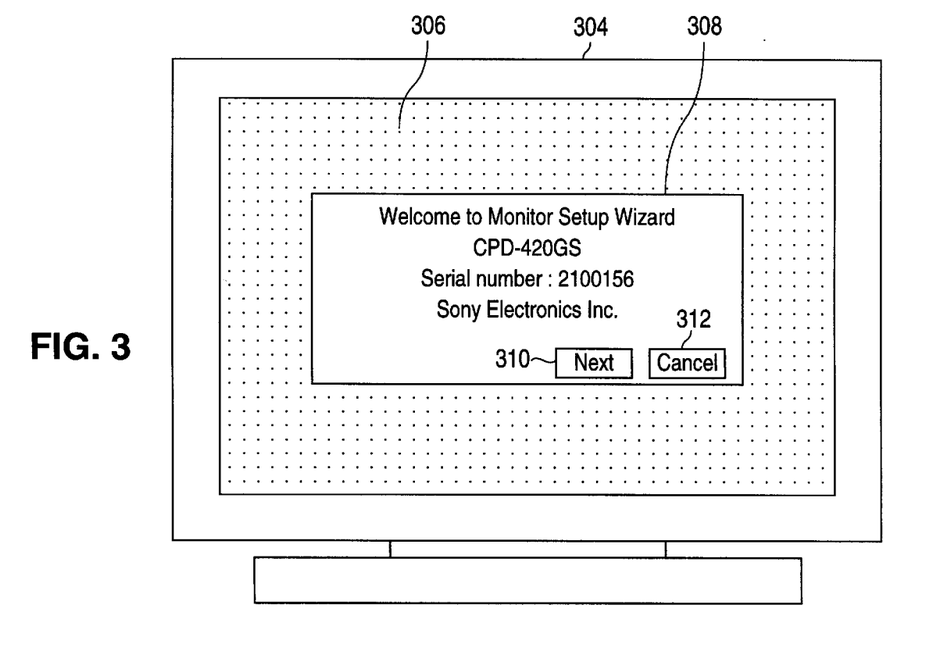
FIG. 3 shows a screen display for setting up the monitor, in accordance with the present invention.

Referring to FIG. 3, there is shown a screen 304 displayed on the monitor 112, in accordance with the present invention.

The screen 304 is invoked in two situations: (1) when the monitor 112 is connected to the computer system 100 for the first time, and (2) when a user changes monitor parameters for the monitor 112 using application produced by another manufacture, such as Window 95 produced by Microsoft.

When the computer system 100 is booted, the processing unit 104 reads the identification of the monitor 112 (monitor ID) from ROM 102, and checks monitor ID stored in ROM 102 against the monitor ID list file stored in the hard disk 108. If the monitor ID does not exist in the monitor list file (thus indicating that the monitor 112 is connected to the computer system 100 for the first time), the processing unit 102 executes the monitor set up application 103 to display the screen 304.

When a user changes a monitor parameter for the monitor 112 using an application produced by another manufacture, such as Window 95 produced by Microsoft, it may cause the needs to adjust the other monitor parameters for the monitor 112. For example, changing resolution and scanning frequency may cause the needs to adjust screen size, center position, and tilt position. Therefore, when the processing unit 102 detects that a user has changed the resolution and scanning frequency, it also displays the screen 304.

Based on the information stored in the ROM 202, the processing unit 102 is able to provide the recommended adjustments to the monitor 112. As shown in FIG. 3, the screen 304 contains a resolution background 306 and an adjustment window 308. The resolution background 306 displays the current resolution at which the monitor 112 is set up. The adjustment window 308 contains the information about the monitor 112 and a "Next" button 310. The information includes model (CPD-420GS, a 19 inch monitor), monitor ID (2100156), and manufacture's name (Sony Electronics Inc). To start a basic set up process, a user clicks the "Next" button 310 using mouse 116 shown in FIG. 1. In response, the processing unit 102 executes the monitor set up application 103 to display a subsequent screen 404. The basic set up process adjusts the monitor parameters including: resolution, brightness, size, center position, and tilt position.

Figure 4:
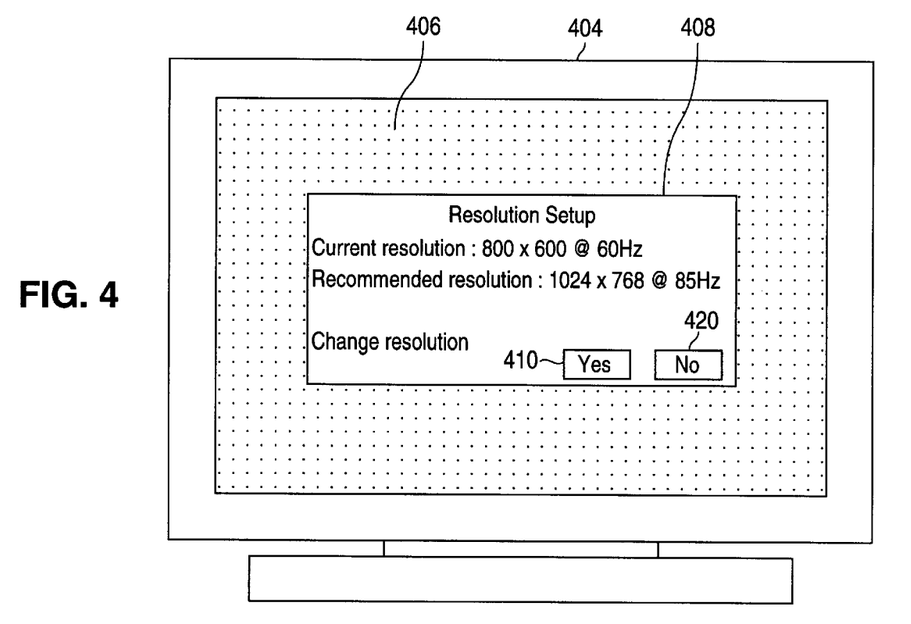
FIGS. 4, 5A and 5B show screens illustrating resolution adjustment to the monitor, in accordance with the present invention.

Referring to FIG. 4, there is shown a screen 404, time sequentially to the screen 304 shown in FIG. 3, in accordance with the present invention.

As shown in FIG. 4, the screen 404 contains a resolution background 406 and an adjustment window 408. The resolution background 406 displays the resolution at which the monitor 112 is set up. The adjustment window 408 displays a message indicating the resolution displayed in the resolution background 406 and a recommended resolution for the monitor 112. Specifically, the message indicates that the monitor 112 is currently set up at 800×600 at 60 Hz vertical scanning frequency. The message also indicates that, for CPD-420GS model monitor, the recommended resolution is 1024×786 at 85 Hz vertical scanning frequency. The display control circuit 208 can calculated the horizontal scanning frequency using the resolution and the vertical scanning frequency. The adjustment window 408 also contains a "Yes" button 410 and a "No" button 420. To continue the adjustment process, the user selects (or clicks) either the "Yes" button 410, or the "No" button 420, using mouse 116.

Figure 5A:
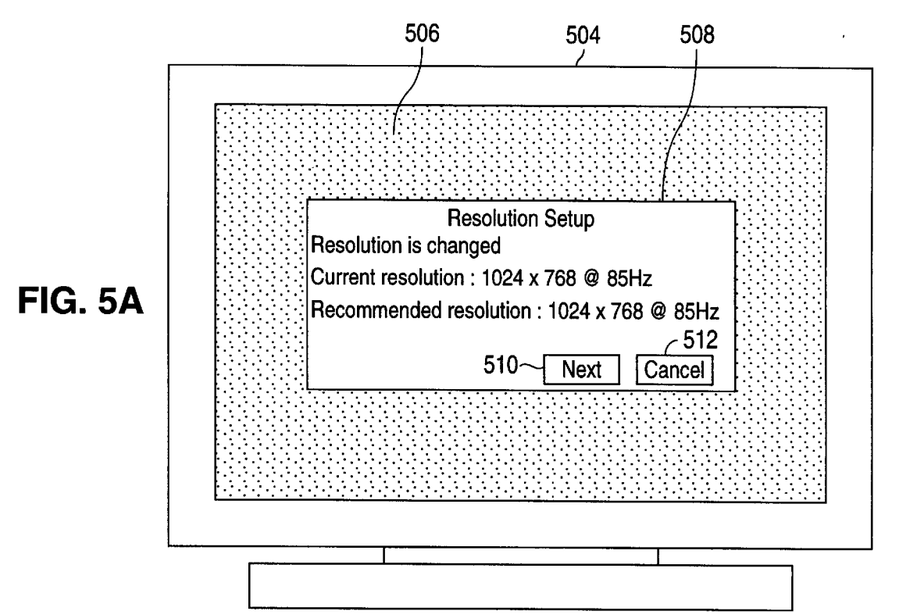

In response to the selection of the "Yes" button 410, the processing unit 102 executes the monitor set up application 103 to store the adjusted resolution (1024×768) and the vertical scanning frequency (85 Hz) into the EEPROM 204. The processing unit 102 then displays a subsequent screen 504A.

Figure 5B:
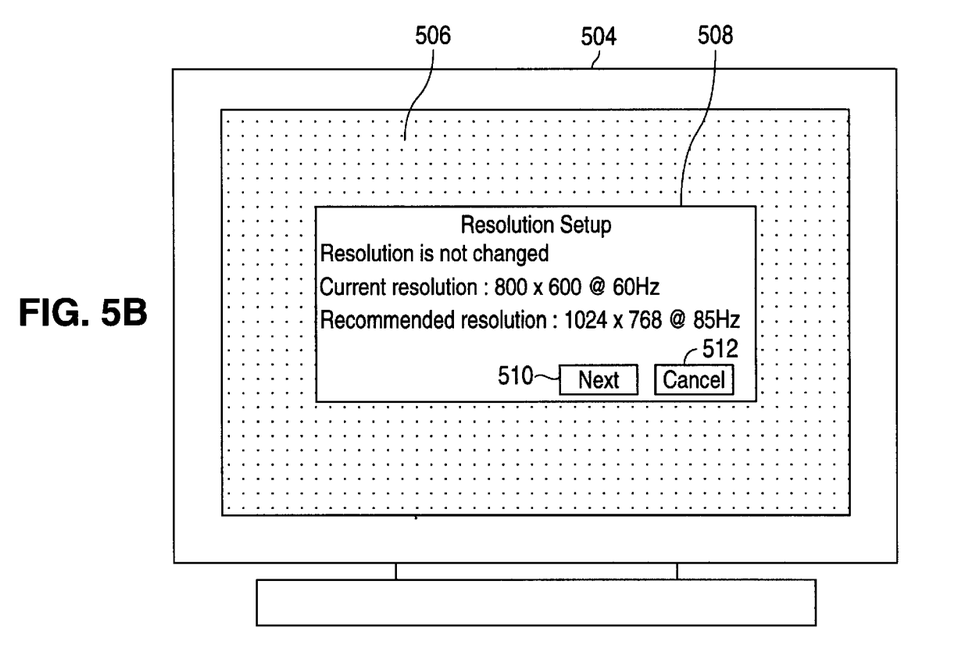

In response to the selection of the "No" button 420, the processing unit 102 executes the monitor set up application 103 to store the adjusted resolution (800×600) and the vertical scanning frequency (60 Hz) into the EEPROM 204. The processing unit 102 then displays a subsequent screen 504B.

Referring to FIG. 5A, there is shown a screen 504A, time sequentially to the screen 404 shown in FIG. 4, in accordance with the present invention.

As shown in FIG. 5A, the screen 504A contains a resolution background 506 and an adjustment window 508. The resolution background 506 displays the resolution newly adjusted, so that a user can observe the impact of the resolution adjustment performed at FIG. 4. The adjustment window 508 displays a message indicating that the resolution is changed to 1024×765 at 85 Hz vertical scanning frequency.

Referring to FIG. 5B, there is shown a screen 504B, time sequentially to the screen 404 shown in FIG. 4, in accordance with the present invention.

As shown in FIG. 5B, the screen 504B contains a resolution background 506 and an adjustment window 508. The resolution background 506 displays the resolution at which the monitor 112 is set up. The adjustment window 508 displays a message indicating that the resolution is 800×600 at 60 Hz vertical scanning frequency.

Figure 6:
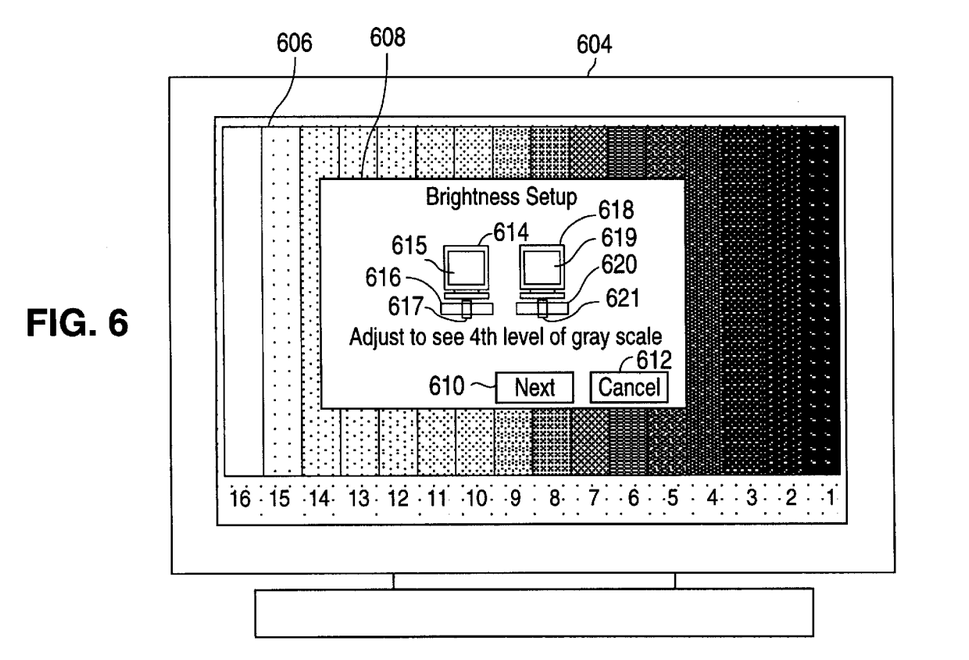
FIG. 6 shows a screen for adjusting the brightness and contrast to the monitor, in accordance with the present invention.

In FIGS. 5A and 5B, the adjustment window 508 also contains a "Next" button 510. To continue the basic set up process, the user clicks the "Next" button 510. In response, the processing unit 102 executes the monitor set up application 103 to display a subsequent screen 604 to adjust the brightness for monitor 112.

Referring to FIG. 6, there is shown a screen 604 time sequentially to the screen 504 shown in FIG. 5, in accordance with the present invention. In describing FIG. 6, it is assumed that has clicked "Next" button 510 on the screen 504A.

As shown in FIG. 6, the screen 604 contains a brightness background 506 and an adjustment window 608. The brightness background 606 displays 16 levels of gray scales numbered from 1 to 16. The adjustment window 506 contains a contrast icon 614 having a contrast displaying region 615, a contrast bar 616 having a contrast sliding button 617, a brightness icon 618 having a brightness display region 619, a brightness bar 620 having a brightness sliding button 621, and a "Next" button 622. The adjustment window 608 also contains a message indicating that the recommended brightness and contrast. The message indicates that, for CPD-420GS model monitor, the brightness and contrast are recommended at the 4th level of the gray scale.

To adjust the contrast for the monitor 112, a user slides the sliding button 617 over the contrast bar 616 using the mouse 116. In response, the processing unit 102 executes the monitor set up application 103 to display the contrast adjusted on the contrast display region 615, so that the user can observer the impact of the contrast adjustment. While sliding the button 617 over the contrast bar 616, the user compares the contrast displayed in the region 616 with the contrast indicated by the 4th level scale in the brightness background 606. The user sets the sliding button 617 in a position where the contrast displayed in region 615 matches that indicated by the 4th level scale in the brightness background 606. In response, the processing unit 102 executes the monitor set up application 103 to store the level of the contrast adjusted into the EEPROM 204.

To adjust the brightness for the monitor 112, a user slides the button 621 over the brightness bar 620 using the mouse 116. In response, the processing unit 102 executes the monitor set up application 103 to display the brightness adjusted on the brightness display region 619, so that the user can observer the impact of the brightness adjustment. While sliding the button 620 over the brightness bar 621, the user compares the brightness displayed in the region 619 with the brightness indicated by the 4th level scale in the brightness background 606. The user sets the sliding button 621 in a position where the brightness displayed in region 619 matches that indicated by the 4th level scale in the brightness background 606. In response, the processing unit 102 executes the monitor set up application 103 to store the level of the brightness adjusted into the EEPROM 204.

Figure 7A:
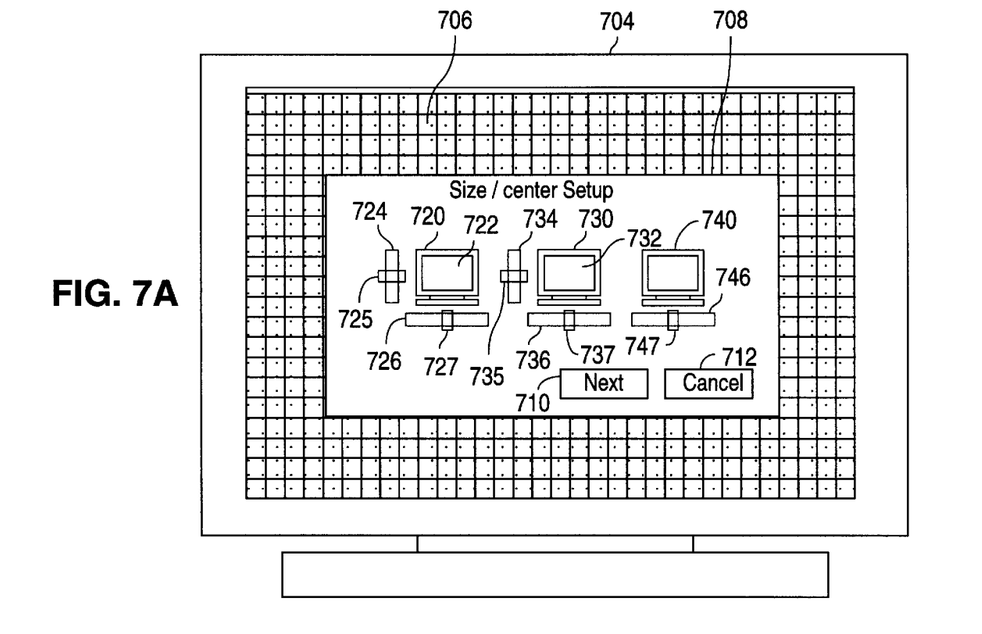
FIGS. 7A–F show screens illustrating the size, center position, and tilt position adjustments to the monitor, in accordance with the present invention.

To continue the basic set up process, the user clicks the "Next" button 610. In response, the processing unit 102 executes the monitor set up application 103 to display a subsequent screen 704.

Referring to FIG. 7A, there is shown a screen 704 time sequentially to the screen 604 shown in FIG. 6, in accordance with the present invention.

As shown in FIG. 7A, the screen 704 contains a position background 706 and an adjustment window 708. The position background 706 contains a scale indicating the size, center position, and tilt position of the screen 704. The adjustment window 708 contains a center position icon 720, a vertical position bar 724 having a vertical sliding button 725, a horizontal position bar 726 having a horizontal sliding button 727. The adjustment window 708 also contains a size icon 730, a vertical size bar 734 having a vertical sliding button 735, a horizontal size bar 736 having a horizontal sliding button 737. The adjustment window 708 additionally contains a tilt position icon 740 and a tilt bar 746 having a sliding button 747. The adjustment window 708 further contains a "Next" button 710.

Figure 7B:
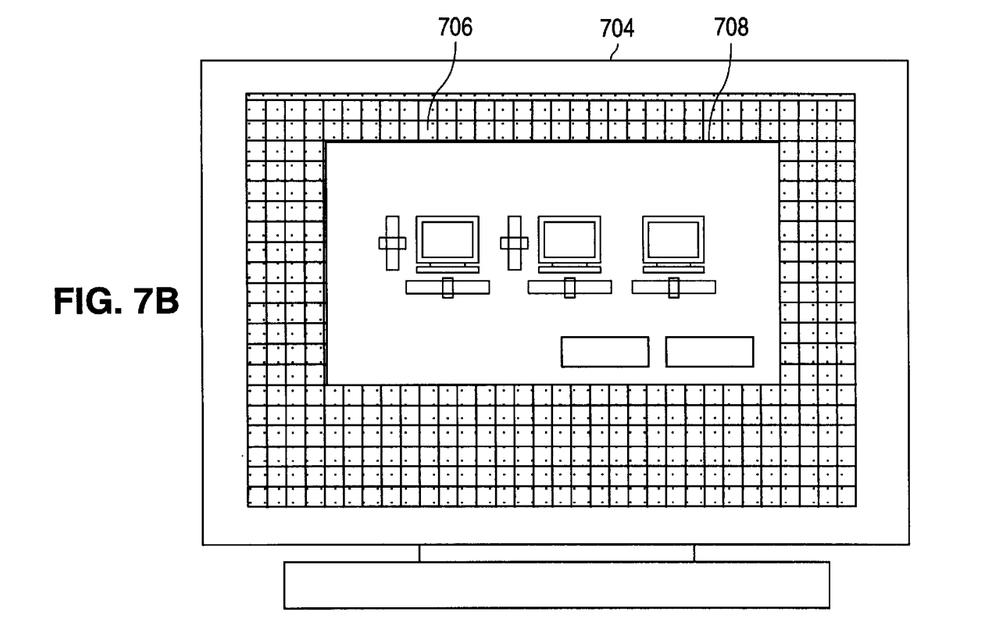

To adjust the vertical center position for the monitor 112, a user slides the button 725 over the vertical position bar 724 using the mouse 116. In response, the processing unit 102 executes the monitor set up application 103 to move the vertical center position of the adjustment window 708, so that the user can observer the impact of the vertical center position adjustment. FIG. 7B shows that the adjustment window 708 is vertically moved up in response to the vertical center position adjustment. When the user sets the sliding button 725 in a desired position over the vertical position bar 724, the processing unit executes the monitor set up application 103 to store the adjusted vertical center position into the EEPROM 204.

Figure 7C:
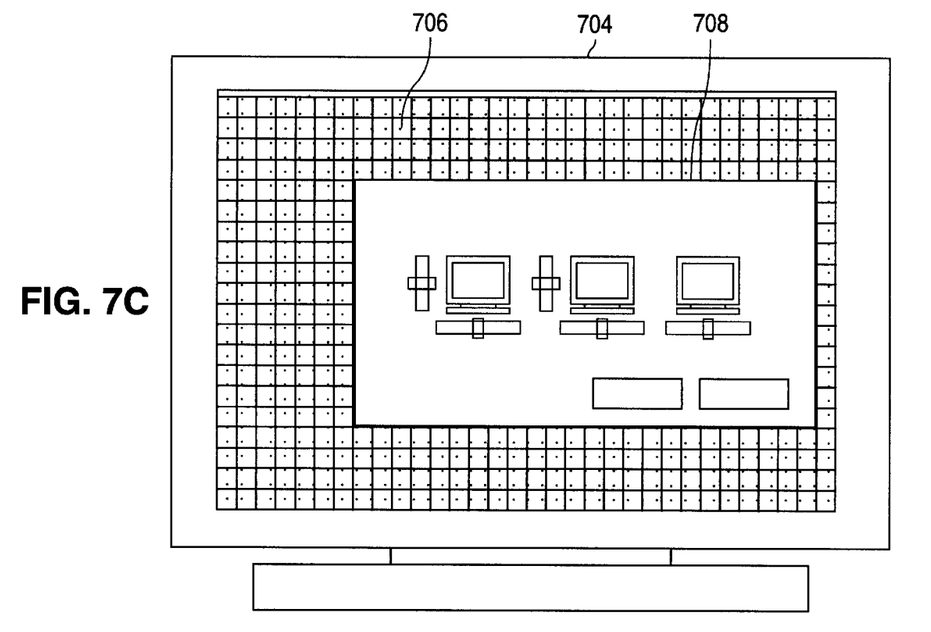

To adjust the horizontal center position for the monitor 112, the user slides the button 727 over the horizontal position bar 726 using the mouse 116. In response, the processing unit 102 executes the monitor set up application 103 to move the horizontal center position of the adjustment window 708, so that the user can observer the impact of the horizontal center position adjustment. FIG. 7C shows that the adjustment window 708 is horizontally moved to the right in response to the horizontal center position adjustment. When the user sets the sliding button 727 in a desired position over the horizontal position bar 726, the processing unit 102 executes the monitor set up application 103 to store the adjusted horizontal center position into the EEPROM 204.

To adjust the vertical size for the monitor 112, a user slides the sliding button 735 over the vertical size bar 734 using the mouse 116. In response, the processing unit 102 executes the monitor set up application 103 to reduce or enlarge the vertical dimension of the position background 706 and the adjustment window 708, so that the user can observer the impact of the vertical size adjustment. When the user sets the sliding button 735 in a desired position over the vertical size bar 734, the processing unit 104 executes the monitor set up application 103 to store the adjusted vertical size into the EEPROM 204.

To adjust the horizontal size for the monitor 112, the user slides the button 737 over the horizontal size bar 736 using the mouse 116. In response, the processing unit 102 executes the monitor set up application 103 to reduce or enlarge the horizontal dimension of the position background 706 and the adjustment window 708, so that the user can observer the impact of the horizontal size adjustment. When the user sets the sliding button 737 in a desired position over the horizontal bar 736, the processing unit 104 executes the monitor set up application 103 to store the adjusted horizontal size into the EEPROM 204.

Figure 7D:
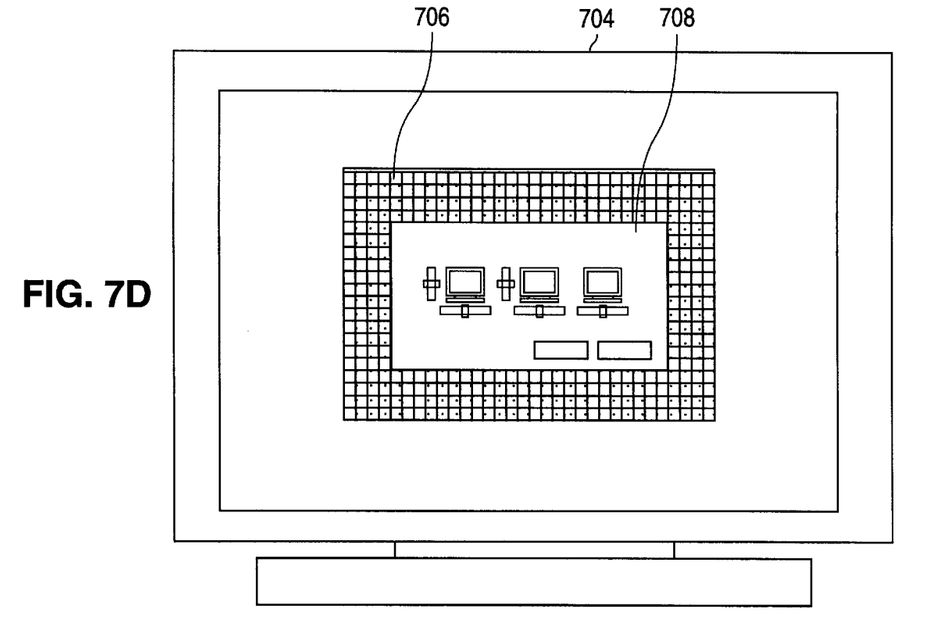

FIG. 7D shows that the position background 706 and the adjustment window 708 are reduced vertically and horizontally in response to vertical and horizontal size adjustments.

Figure 7E:
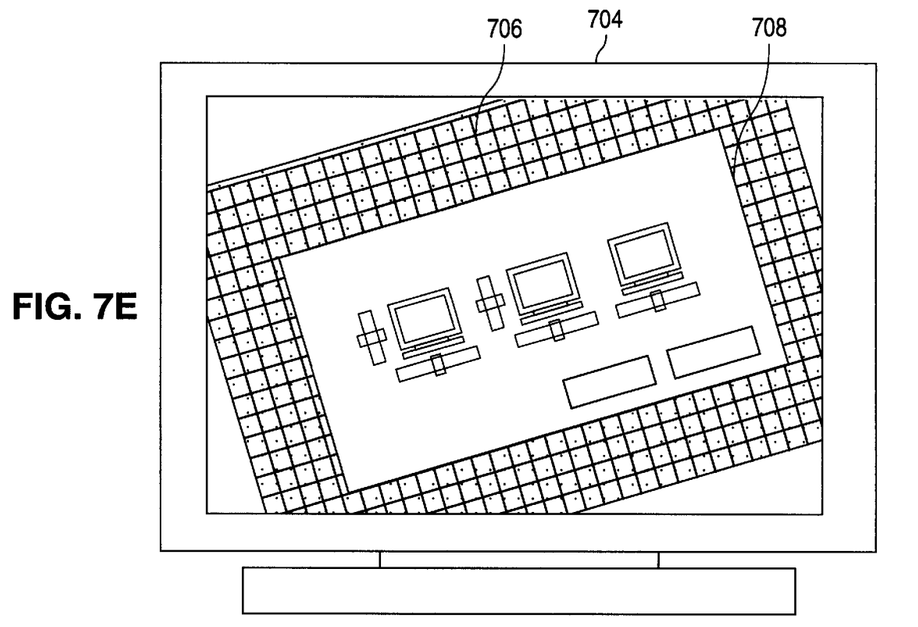

To tilt the display on the screen 704 to the left, a user slides the button 747 to the left over the tilt position bar 746 using the mouse 116. In response, the processing unit 102 executes the monitor set up application 103 to rotate the screen 704 to the left, so that the user can observe the impact of the left tilt adjustment. FIG. 7E shows that the adjustment window 708 is rotated to the left in response to a left tilt adjustment.

Figure 7F:
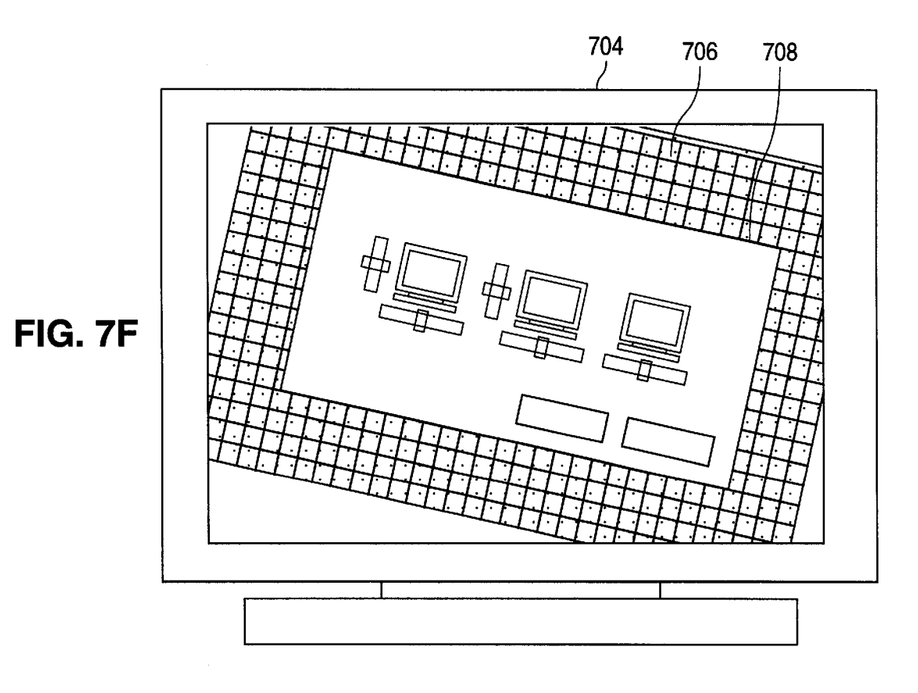

To tilt the display on the screen 704 to the right, a user slides the sliding button 747 to the right over the tilt position bar 746 using the mouse 116. In response, the processing unit 102 executes the monitor set up application 103 to rotate the screen 704 to the right, so that the user can observer the impact of the right tilt adjustment. FIG. 7F shows that the adjustment window 708 is rotated to the right in response to a right tilt adjustment.

When the user sets the sliding button 747 in a desired position over the tilt position bar 734, the processing unit 102 executes the monitor set up application 103 to store the tilt position adjusted into the EEPROM 204.

Figure 8:
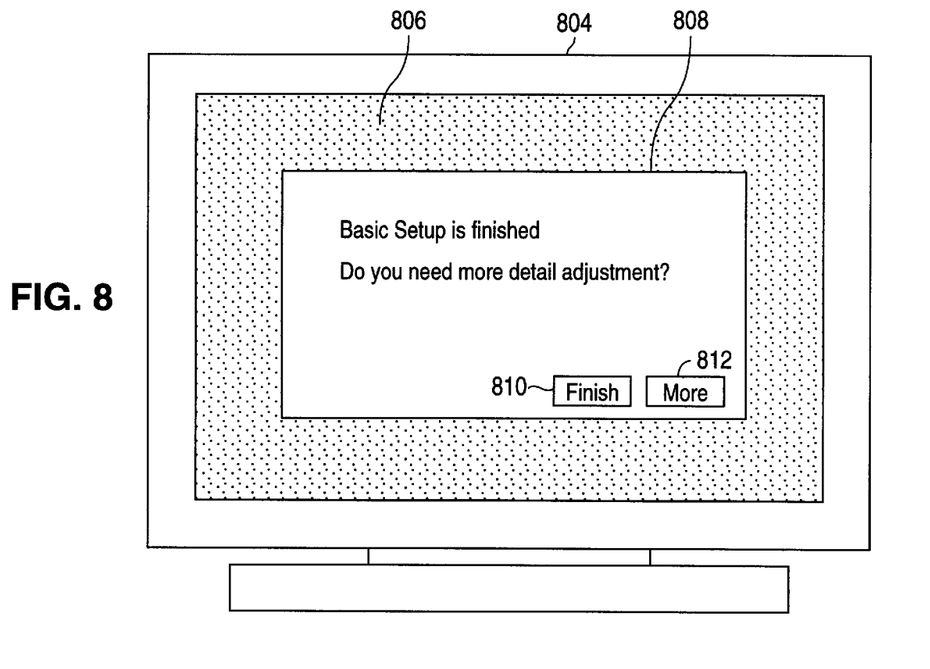
FIG. 8 shows a screen for completing the monitor adjustment, in accordance with the present invention.

To continue the basic set up process, the user clicks the "Next" button 710. In response, the processing unit 102 executes the monitor set up application 103 to display a subsequent screen 804.

Referring to FIG. 8, there is shown a screen 804 time sequentially to the screen 704 shown in FIG. 7, in accordance with the present invention.

As shown in FIG. 8, the screen 804 contains a resolution background 806 and an adjustment window 808. The resolution background 806 displays the resolution to which the monitor 112 has been adjusted. The adjustment window 808 contains a message indicating that the basic set up process is completed. To quit the basic set up process, the user clicks the "Finish" button 810. In response, the processing unit 102 executes the monitor set up application 103 to end the basic set up process. If the monitor ID for monitor 112 does not exist in the monitor ID list file, the processing unit stores the monitor ID into the monitor ID list file before ending the basic set up process.

Although the present invention has been shown and described with respect to preferred embodiments, various changes and modifications are deemed to lie within the spirit and scope of the invention as claimed.

What is claimed is:

1. A method for allowing a user to automatically adjust a monitor having a screen, comprising the steps of:

displaying, on the screen, a pattern background for indicating the current displaying quality of the screen;

displaying, on the pattern background, an adjustment window;

detecting that the monitor is used for the first time, or the resolution and scanning frequency of the monitor have been changed and providing recommended adjustments to the monitor to the user; and performing adjustment to the monitor through the adjustment window according to responses of the user.

2. The method of claim 1, further comprising the step of:

in response to the adjustment performed at the step of performing the adjustment, changing the pattern ground for indicating a result of the adjustment.

3. The method of claim 2, wherein:

the step of displaying the pattern ground displays a resolution at which the screen is currently set up;

the step of displaying the adjustment window displays the adjustment window containing at least one element for adjusting the resolution of the screen; and the step of performing the adjustment performs the resolution adjustment by operating on the element.

4. The method of claim 3, further comprising the step of:

detecting the model of the monitor; and displaying a suggested resolution adjustment suitable to monitor.

5. The method of claim 2, wherein:

the step of displaying the pattern ground displays a plurality of gray scales;

the step of displaying the adjustment window displays at least one element for adjusting brightness of the screen; and the step of performing the adjustment performs brightness adjustment by operating the element.

6. The method of claim 5, further comprising the steps of:

detecting the model of the monitor; and displaying a suggested brightness adjustment suitable to monitor.

7. The method of claim 5, further comprising the steps of:

displaying the adjusted brightness.

8. The method of claim 5, wherein:

the step of displaying the pattern background displays a plurality of gray scales;

the step of displaying the adjustment window displays at least one element for adjusting brightness of the screen; and the step of performing the adjustment performs contrast adjustments by operating the element.

9. The method of claim 8, further comprising the steps of:

detecting the model of the monitor; and displaying suggested contrast adjustment suitable to monitor.

10. The method of claim 5, further comprising the steps of:

displaying the adjusted contrast.

11. The method of claim 1, wherein:

the step of displaying the adjustment window displays the adjustment window containing at least one element; and the step of performing the adjustment performs the adjustment by operating the element.

12. The method of claim 1, further comprising the step of:

detecting that the monitor needs to be adjusted.

13. The method of claim 1, further comprising the steps of:

detecting the model of the monitor; and displaying a suggested adjustment suitable to the monitor.

14. The method of claim 1, wherein:

the step of displaying the pattern background displays a scale for indicating the size at which the monitor is being set;

the step of displaying the adjustment displays at least one element for adjusting the size; and the step of performing the adjustment performs size adjustment by operating the element.

15. The method of claim 14, further comprising the step of:

in response to the adjustment performed at the step of performing the adjustment, changing the scale of the pattern background for indicating a result of the size adjustment.

16. The method of claim 1, wherein:

the step of displaying the pattern ground displays a scale for indicating center position at which the monitor is being set;

the step of displaying the adjustment window displays at least one element for adjusting the center position; and the step of performing the adjustment performs center position adjustment by operating the element.

17. The method of claim 16, further comprising the step of:

in response to the adjustment performed at the step of the performing the adjustment, changing the scale of the pattern background for indicating a result of the center position adjustment.

18. The method of claim 1, wherein:

the step of displaying the pattern background displays a scale for tilt position at which the monitor is being set;

the step of displaying the adjustment window displays at least one element for adjusting the tilt position of the monitor; and the step of performing the adjustment performs tilt position adjustment by operating the element.

19. The method of claim 18, further comprising the step of:

in response to the adjustment performed at the step of performing the adjustment, changing the scale of the pattern background for indicating a result of the tilt position adjustment.

20. An apparatus for allowing a user to automatically adjust a monitor having a screen, comprising:

means for displaying, on the screen, a pattern background for indicating current displaying quality of the screen;

means for displaying, on the pattern background, an adjustment window;

means for detecting that the monitor is used for the first time, or the resolution and scanning frequency of the monitor have been changed and providing recommended adjustments to the monitor to the user; and means for performing adjustment to the monitor through the adjustment window according to responses of the user.

21. An apparatus for allowing a user to automatically adjust a monitor having a screen, comprising:

means for displaying, on the screen, a pattern background for indicating the current displaying quality of the screen;

means for displaying, on the pattern background, an adjustment window; means for detecting the model of the monitor;

means for displaying a suggested adjustment suitable to the monitor to the user; and means for performing adjustment to the monitor through the adjustment window according to responses of the user.

22. A method for allowing a user to automatically a monitor having a screen, comprising the steps of:

displaying, on the screen, a pattern background for indicating the current displaying quality of the screen;

displaying, on the pattern background, an adjustment window;

detecting the model of the monitor;

displaying a suggested adjustment suitable to monitor to the user; and performing adjustment to the monitor through the adjustment window according to responses of the user.

* * * * *